March 19, 1963 O. E. KRUEGER 3,081,857
PORTABLE CONVEYER PATH
Filed Feb. 19, 1960 2 Sheets-Sheet 1
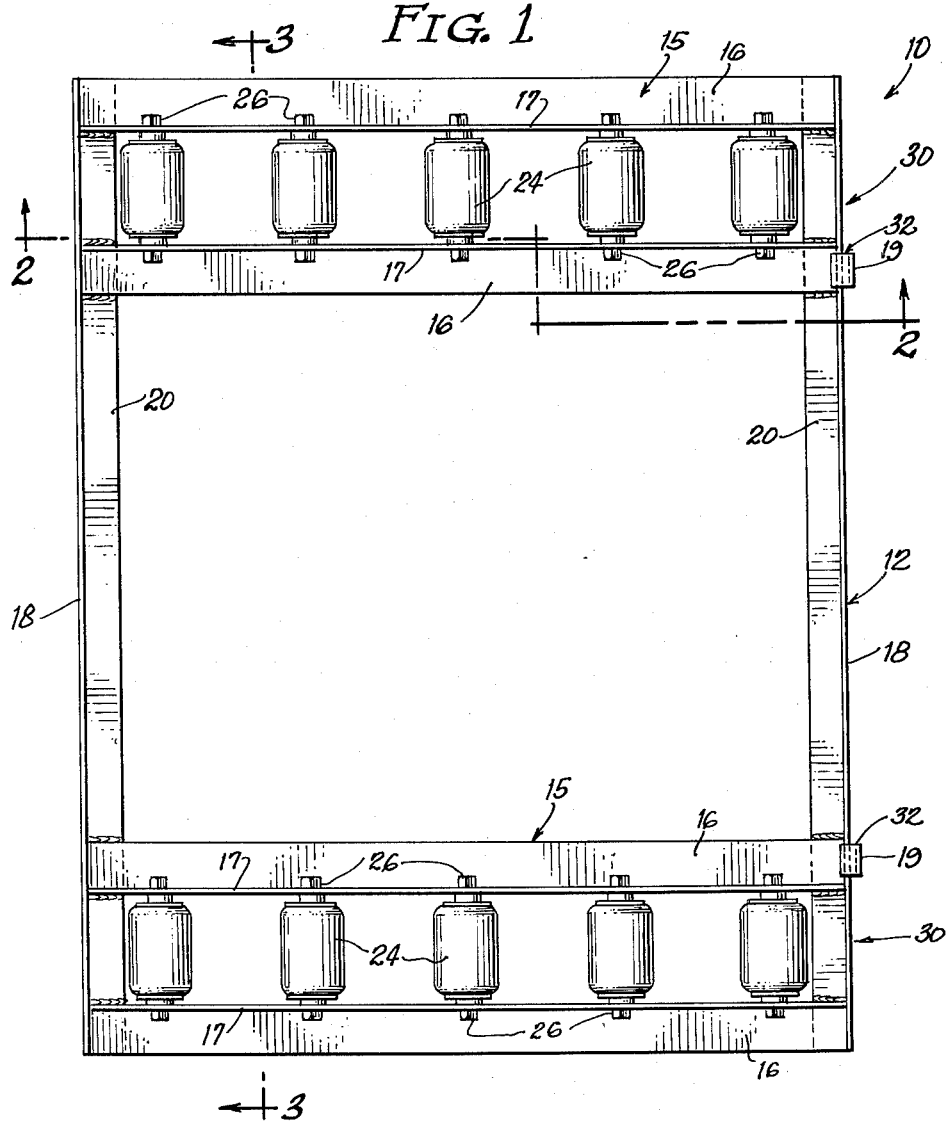
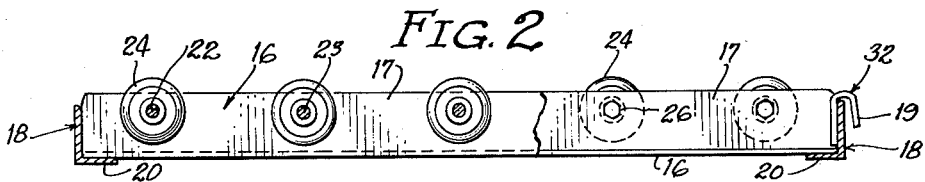
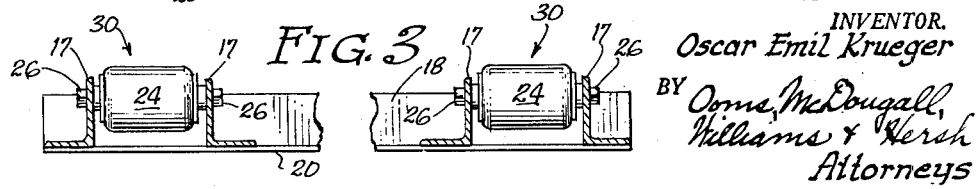
INVENTOR.
Oscar Emil Krueger
BY Ooms, McDougall,
Williams & Hersh
Attorneys March 19, 1963
O. E. KRUEGER
3,081,857
PORTABLE CONVEYER PATH
Filed Feb. 19, 1960
2 Sheets-Sheet 2
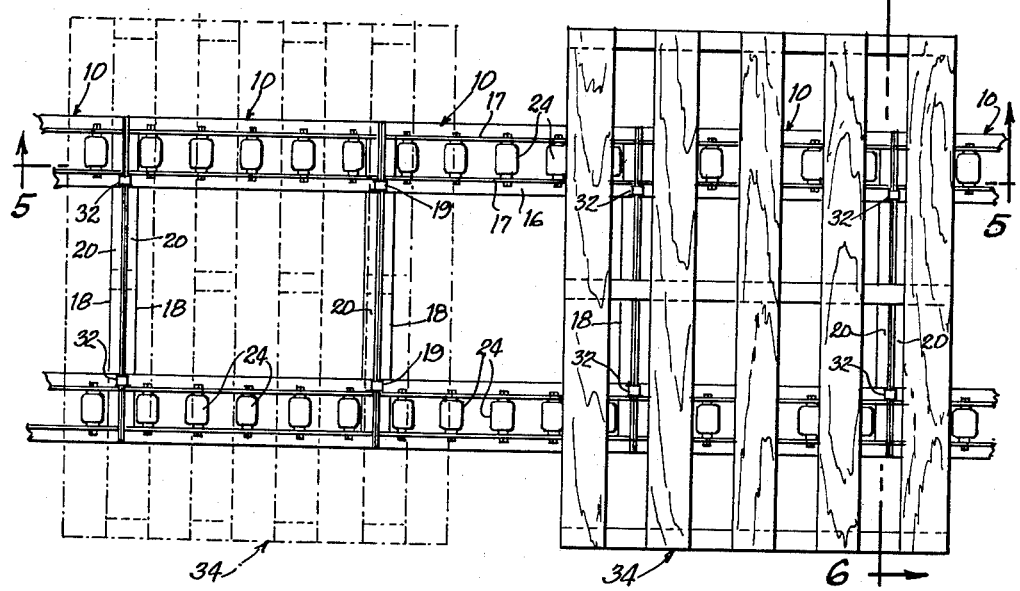
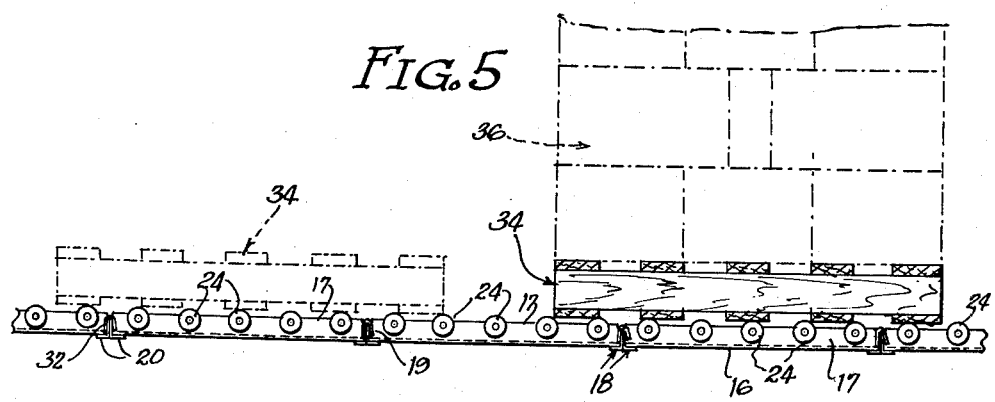
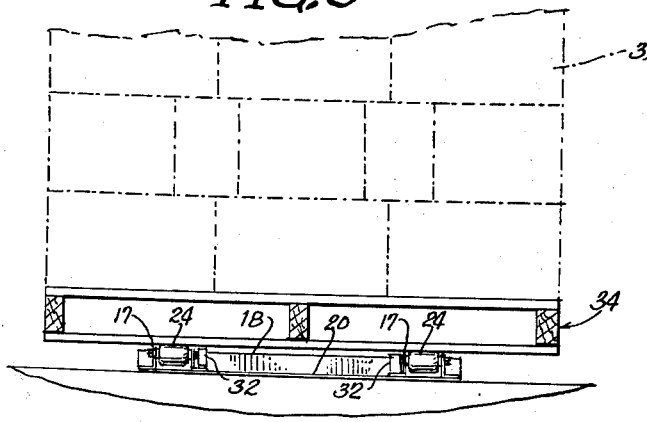
INVENTOR.
Oscar Emil Krueger
BY Ooms, McDougall,
Williams & Hersh
Attorneys United States Patent Office 3,081,857
Patented Mar. 19, 1963

3,081,857
PORTABLE CONVEYER PATH
Oscar Emil Krueger, Chicago, Ill., assignor to Continental Freezers of Illinois, Division of F. H. Prince & Co. Inc., Chicago, Ill., a corporation of Delaware
Filed Feb. 19, 1960, Ser. No. 9,728
3 Claims. (Cl. 193—35)

The present invention relates to a means for achieving a conveyor path and, particularly, means for providing a conveyor path which is stable and which is flexible for movement from one location to another while simultaneously embodying extensibility for increase or decrease in length.

More specifically, this invention relates to a means for loading and unloading cartons of goods from the body of a truck, trailer, railroad car or the like, wherein the cartons are carried to and from the described truck, trailer or railroad car on a pallet on which a large number of such cartons are stacked. In most instances, the truck, trailer, or railroad car is aligned with a dock for movement of the pallets into and out of the truck. During the greater majority of the time, the portion of the space wherein the cartons are stacked is some distance from the door so that it becomes necessary either to carry each carton from the pallet deposited at the door of the truck or else to provide means for movement of the loaded pallets over the floor of the truck to the area within the truck adjacent the location in which the cartons are being stacked.

To the present, use has been made of dollies, in the form of wheeled platforms, on which the pallets are deposited to enable movement of the loaded pallets over the floor or bed of the truck to or from unloading and loading positions, respectively. During loading, the pallet having the cartons stacked thereon is deposited by the forked carrier truck onto the dolly at the back of the truck, and the loaded pallet is then pushed into the interior of the truck to the position where the cartons can be unloaded from the pallet for stacking in the truck for shipment. When the pallet is emptied, the emptied pallet and dolly are rolled back to the door for replacement of the unloaded pallet with another loaded pallet, and the cycle is repeated.

It will be obvious from the described sequence of events that considerable time will be lost if it becomes necessary to wait for the forked truck to bring a loaded pallet for replacement of the one that has been emptied, and too much manpower and equipment is tied up if a forked carrier is made available for each truck in order to keep a loaded pallet ready for replacement.

These problems of synchronization, which are seldom met in commercial operations, have been alleviated somewhat by the use of two or more dollies per truck, whereby one is displaced inwardly into the truck with a pallet for unloading, while one or more other dollies remain at the door of the truck to receive a loaded pallet when brought by the forked carrier. While this tends to free the forked carrier and alleviate some of the waiting period, it will be obvious that the presence of the loaded pallets between unloading position and the door of the truck will necessitate removal of the unloaded pallet and dolly by hand. This presents a problem because of the limited space available in the truck alongside the loaded pallets, and because of the weight of the dollies and pallets.

These same problems in reverse order arise in unloading the truck. It is necessary to have an empty pallet on a dolly at the position interior of the truck where the cartons are stacked. When a pallet is loaded, it is moved on the dolly to the door of the truck where it awaits the forked carrier for removal. Unless a carrier is immediately available, the unloading operation may be delayed for some time. Here again, the loaded pallets can be left at the door of the truck while another dolly and empty pallet are carried into the truck for loading, but the problems of space, weight and delay are still encountered.

In a further attempt for a solution, use has been made of a roller conveyer supported on legs above the floor of the truck but such conveyer means is limited to use with separate cartons or pallets of limited weight. Generally, such conveyers are of a constant length so as to have limited utility where the distance of travel gradually varies from one extreme to another as the space within the truck is either filled or emptied.

Each of the systems previously described is also confronted with the problem arising from differences in level between the floor of the truck and the platform and, of even more importance, unevenness in the floor of the truck. The latter condition makes it difficult to advance a loaded dolly over the floor of the truck and the uneven floor provides instability in movement of the conveyance means, whereby the cartons are subject to displacement from their stacked position on the pallet. Sometimes it becomes necessary to jar the dolly in order to effect the desired movement over the worn or uneven surface, with the result that the operators are subjected to the dangers of falling cartons, and the goods within the cartons are subject to falling impacts which may break the carton or the containers in which the goods are packed. Such uneven surfaces also introduce instability in roller conveyers, when used.

It is an object of this invention to provide a novel conveyer path for moving cartons and the like into and out of a carrier such as a truck, railroad car or the like.

A further object is to provide a stable conveyer path which is flexible in operation for assembly and disassembly to increase or decrease the length of the conveyer path, as required, and to permit shifting movement of the conveyer path from one location to another.

Another object is to produce a conveyer path which is insensitive to the unevenness of the floor over which it is disposed and which provides for stable and even movement of pallets over the surface thereof in the direction toward and away from position of use.

More specifically, it is an object of this invention to provide a means for loading and unloading which is free of the objections of present conveyer systems, as previously pointed out.

These and other objects and advantages of this invention will hereinafter appear and for purposes of illustration, but not of limitation, an embodiment of the invention is shown in the accompanying drawings, in which—

FIGURE 1 is a top plan view of a conveyer section of the conveyer path embodying the features of this invention;

FIG. 2 is a sectional elevational view taken along the line 2—2 of FIG. 1;

FIG. 3 is a fragmentary sectional elevational view taken along the line 3—3 of FIG. 1;

FIG. 4 is a top plan view of a novel conveyer path embodying a number of sections of the type illustrated in FIG. 1;

FIG. 5 is a side elevational view of the conveyer path of FIG. 4 taken along the line 5—5 of FIG. 4; and FIG. 6 is a sectional elevational view taken along the line 6—6 of FIG. 4.

A top view of a conveyer section 10 of the novel conveyer path of this invention is shown in FIG. 1. As illustrated, the conveyer section comprises a frame 12 and rollers 24. The frame 12 comprises two pairs 15 of track members 16 and two end members 18 joined together at right angles to a rectangular construction. The pairs of track members 16 are attached to the end members 18 adjacent their outer edge portions. As shown, the members 16 and 18 are formed of angle irons, with one arm 20 of the end members 18 positioned to underlie the track members 16 so that the arms 20 of the members 18 will lie flat on the supporting surface to furnish a stable support for the conveyer section 10 when the latter is positioned upon the surface. The members 16 and 18 may be joined by any conventional metal-forming technique such as welding, riveting, bolting or the like.

The upright arms 17 of the track members 16 are formed with longitudinally spaced-apart openings 22 in the upper portions thereof, with the openings in one track aligned cross-wise with the openings in the other track of each pair for enabling the end portions of horizontally disposed axles 23 of rollers 24 to extend therethrough rotatably to support the rollers between the spaced tracks in each pair. The rollers are dimensioned to have a length less than the spaced relationship of the facing upright arms 17 of each track for enabling free rotational movement therebetween. The rollers are also dimensioned to have a maximum radius which is less than the distance of the openings 22 from the plane of the support arms 20, but greater than the distance of the openings from the upper edges of the arms 17 so that the peripheral surface of the rollers will be spaced from the plane of the arms 20 to enable free rotational movement while the frame is at rest upon the flooring or other supporting surface, while the peripheral portions of the rollers will extend upwardly beyond the plane of the uppermost portions of the frame members for support of any packages or pallets at rest thereon. The shafts or axles 23 of the rollers 24 are secured in the assembled relation in the arms 17 by any suitable means, such as by means of the nut members 26. The described assembly comprising the pairs 15 of track members 16 and the longitudinally aligned rollers 24 rotatably mounted thereon will hereinafter be referred to as a track section 30.

Each conveyor section 10 also embodies means for interconnection with adjacent sections to hold one section in endwise alignment with another in providing a stabilized continuous conveyer path. As shown, such interconnection means comprises pairs of inverted U-shaped hook members 32 having one arm joined to one of the end members 18, while the free arm 19 extends forwardly or rearwardly thereof to extend over the end member 18 of the adjacent section (see FIG. 4). It will be understood that such interconnecting means may be achieved by other equivalent devices, such as spring clamps or the like. Each of the hook members 32 in each pair is fixed to a portion of the end member 18 adjacent the track members 16 and, preferably, immediately inwardly of the inner member 16 of each pair. By this arrangement, it is possible to militate against lateral displacement of the interconnected sections 10 forming the conveyer path since the hook members 32 will operate as stops upon engagement of the arms 17 of the members 16 to prevent relative lateral movements.

A plurality of these sections 10 may be interconnected in lengthwise alignment, as shown in FIG. 4, to form a conveyer path of any desired length. Such interconnection is achieved by hooking together the end members 18 of adjacent sections with tracks 30 of adjacent sections in alignment, and rollers 24 positioned with their axes of rotation extending crosswise to the lengthwise direction of the path.

In operation, a pallet 34 loaded with cartons 36 may be placed on the conveyer path. When so placed, the bottom side of the pallet will rest on the rollers 24 thereby to be spaced a short distance above the frame members 12. As the pallet 34 is displaced lengthwise along the conveyer path, it will engage succeeding roller members of the sections 10, whereby such rollers 24 will be caused to rotate about their axes to provide essentially frictionless movement of the loaded pallets in either direction along the path.

It is also apparent that pallets 34 will be held in a stable position during such movement, notwithstanding depressions or other unevenness which might exist in the floor 38. A stable support is furnished even when the underlying surface has been made uneven, as by the type of wear resulting from the previous use of dollies to transport loaded pallets over the surface. This is because the sections 10 are formed with elongate arms 20 which rest over a substantial area of the surface to minimize unevenness and to provide stability. Thus, use of the roller path of the present invention will minimize any rocking or tilting movement which otherwise might be experienced, and it will substantially completely eliminate stoppages heretofore occasioned by such unevenness, thereby to avoid pars or impacts to displace the pallet along the path.

Use of the roller path of the present invention permits greater flexibility in operation by comparison with the previous use of dollies. Because of the ability to displace the pallets lengthwise over the conveyer path, it is possible to free sections of the conveyer path for receiving additional pallets without waiting for the previous pallets to be unloaded, as in present practice with dollies. Thus, more than one pallet 34 can be loaded or unloaded onto the conveyer path without requiring the use of forked lift trucks between loadings to carry away the pallets. In loading, the lift truck may bring pallets 34 at any time for disposition upon the conveyor path. Such loaded pallets may be displaced over the conveyer path into the truck into the area being loaded. When the pallet has been freed of the cartons, the pallet can be removed from the conveyer path to free the space for replacement with another loaded pallet previously positioned on the conveyer path. Continuous unloading into the car or truck without the need to wait for removal of the unloaded pallets and dolly therefrom, or the replacement with another loaded dolly by a forked truck, as in the present practice, is possible.

As the truck or railroad car is filled, the innermost portions of the conveyer path can be disassembled merely by lifting the sections from the bed of the truck, thereby to provide a continuous conveyer path from the door of the truck to the area where the cartons are being unloaded.

Similarly, as the truck is being unloaded, the conveyer path can be lengthened to extend continuously from the door of the truck to the area where the cartons are being loaded from the truck onto the pallets. As each pallet is loaded, it can be displaced over the conveyer path towards the door for subsequent removal by the lift truck, whenever the latter is available. This is unlike the present dolly system wherein the loaded dolly is rolled over the bed of the truck to the door to await its removal by a lift truck and replacement by another dolly which is thereafter rolled back into the truck for loading.

As the cartons are removed from the truck, additional conveyer sections 10 can be laid down in connection with the others to extend the conveyer path into the truck. Thus the conveyer path can be adjusted in length to meet existing conditions while maintaining stability sufficient to avoid tipping and dangerous conditions. As such, the conveyer system of this invention constitutes a considerable improvement over roller systems wherein such roller conveyer sections are supported on legs over the surface.

Each section 10 of the conveyer path is of considerably lesser weight than the dolly system heretofore employed. As a result, the sections 10 can be manually displaced into alignment with others to lengthen the conveyer path, or else be displaced therefrom to shorten the conveyer path. The sections can be handled manually for movement into and out of the truck by reason of their relative low weight.

The novel feature of this construction enables the sections to be stacked for storage and it enables the lowermost section to be used as a conveyer for displacement of the stack from one station of use to another. In this latter instance, the sections are stacked one upon the other with the base section of the arms 20 lowermost to provide a flat supporting surface. However, the lowermost section in the stack can be inverted whereby the flat arms 20 will be uppermost to provide a flat base upon which the other sections can be stacked, while the top side rests on the floor to bring the rollers into contact with the supporting surface. This will enable the entire stack to be rolled over the surface from place to place without the need of a separate dolly or forked truck.

It will be understood that numerous changes may be made in the details of construction, arrangement and operation without departing from the spirit of the invention, especially as defined in the following claims.

I claim:

1. A portable conveyor path adapted to be situated directly on the floor of a carrier and to connect the floor of the carrier with a loading dock, comprising a plurality of conveyor path sections adapted to be interconnected one with another in an aligned relationship to vary the length of the path, each of said conveyor path sections comprising a supporting frame formed of a laterally spaced apart pair of laterally spaced apart parallel longitudinal members which extend through the length of the section, and longitudinally spaced apart structural members which extend crosswise through the width of the section at the opposite ends of said longitudinal members and having a vertically extending upright portion at the opposite ends of the section, rollers rotatably mounted on shafts extending crosswise between the longitudinal members of each pair in longitudinally spaced apart relation between the crosswise end members to form a pair of laterally spaced apart roller sections, shafts mounting the rollers to define their axis of rotation being spaced upwardly from the base of the frame by an amount greater than the radius of the rollers and spaced downwardly from the upper extremities of the frame by an amount less than the radius of the rollers whereby the peripheral surfaces of the rollers project above the surface of the frame and out of contact with the floor on which the frame rests, and laterally spaced apart clip members rigid with a crosswise extending structural member on one end of the frame section and adapted to engage the crosswise extending structural frame member of an endwise aligned frame section to effect an interconnected relationship therebetween.

2. A portable conveyor path as claimed in claim 1 in which the clip members comprise inverted U-shaped members having one arm secured to the crosswise structural member of one frame with the other arm spaced therefrom by an amount corresponding to the thickness of the upright portion to receive the upright portion of the aligned frame section therebetween.

3. A portable conveyor path as claimed in claim 1 in which said clips are laterally spaced apart by an amount corresponding to the laterally spaced relationship between the pairs of laterally spaced apart roller supporting frame members so that the clips engage the inner edges of the innermost frame section of each pair to block relative lateral movement between interconnected sections.

References Cited in the file of this patent

UNITED STATES PATENTS

| | | |
|---|---|---|
| 714,432 | Alvey | Nov. 25, 1902 |
| 867,350 | Dehler | Oct. 1, 1907 |
| 978,466 | Mathews | Dec. 13, 1910 |
| 2,118,195 | Hague | May 24, 1938 |
| 2,298,921 | Barker | Oct. 13, 1942 |